(12) United States Patent
Smith et al.

(10) Patent No.: US 6,254,324 B1
(45) Date of Patent: Jul. 3, 2001

(54) BLIND RIVET

(75) Inventors: D. R. Smith; S. Morris; S. V. Jones, all of Birmingham (GB)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/503,900

(22) Filed: Feb. 15, 2000

(30) Foreign Application Priority Data

Feb. 19, 1999 (GB) .................................................. 9903723

(51) Int. Cl.⁷ ...................................................... F16B 13/04
(52) U.S. Cl. ................................. 411/34; 411/38; 411/43
(58) Field of Search ............................... 411/34, 37, 38, 411/43, 71–74

(56) References Cited

U.S. PATENT DOCUMENTS

| | | | |
|---|---|---|---|
| 2,542,967 | * | 2/1951 | Waechter . |
| 3,257,889 | * | 6/1966 | Fischer . |
| 4,781,500 | * | 11/1988 | Mauer . |
| 4,958,971 | * | 9/1990 | Lacey . |
| 5,496,140 | * | 3/1996 | Gossmann . |

FOREIGN PATENT DOCUMENTS

| | | | |
|---|---|---|---|
| 168355 | * | 1/1986 | (EP) . |
| 34333 | * | 9/1965 | (JP) . |

* cited by examiner

Primary Examiner—Flemming Saether
(74) Attorney, Agent, or Firm—Edward D. Murphy

(57) ABSTRACT

A blind rivet (10) comprises a substantially cylindrical body (2) and a mandrel (4) which body includes one or more circumferential grooves (12,14) formed on the outer face of the body. Each groove (12,14) is reinforced by one or more axial reinforcing ribs (16).

3 Claims, 2 Drawing Sheets

BLIND RIVET

BACKGROUND OF THE INVENTION

The present invention relates to an improved multigrip blind rivet, of the type which has circumferential grooves spaced at intervals along its length.

A known form of multigrip blind rivet has circumferential grooves spaced at intervals along its length. In the setting of this type of blind rivet, the grooves collapse in an axial direction and the rivet body portions between the grooves expand radially to form a characteristic "cottage loaf" setting.

For this type of rivet, there are two basic design considerations that require improvement:
  a) In the formation of the grooves the rivet body material is work hardened in the groove portion and, unless there is close control of material displacement, there can be cracking of the material on setting, resulting in a very low tensile strength of the rivet and, in extreme conditions, premature failure of the joint.
  b) Due to variations in raw material composition and specification, and manufacturing tolerances, the setting and checking of the machinery for making the grooves require constant attention.

European Patent No 0 663 536 B1 describes and claims a blind rivet with a tensile mandrel comprising a mandrel head and a mandrel shank, and with an essentially cylindrical rivet sleeve which surrounds the tensile mandrel over part of its length, and which comprises at least one weakening zone in the longitudinal extent, wherein each weakening zone is formed by several recesses which are distributed in the circumferential direction and essentially arranged at the same axial position, characterised in that the bottoms of the recesses in each case essentially form a secant to the cylinder circumference of the rivet sleeve or run in a radial direction within this secant, so that at their centre they are made deeper in a direction towards the centre axis of the rivet sleeve than at the edges.

The rivet according to European Patent No 663 536 has the disadvantage that it is relatively expensive to manufacture, requiring close control of the process of manufacture. In particular, the indents which are opposed to each other have to be matched precisely.

SUMMARY OF THE INVENTION

It is an object of the present invention to provide a multigrip blind rivet in which the above disadvantages are reduced or substantially obviated. It is a particular object of the present invention to provide a multigrip blind rivet with improved setting performance, and to reduce the manufacturing accuracy which is normally required for the manufacture of this type of rivet.

The present invention provides a blind rivet which comprises a substantially cylindrical rivet body and a mandrel, the rivet body including one or more circumferential grooves formed on the outer face of the rivet body characterised in that each circumferential groove is reinforced by one or more axial reinforcing ribs.

The rivet body is preferably provided with between one and four circumferential grooves and these are preferably formed by rolling.

Each of the circumferential grooves is reinforced by one or more, preferably between four and sixteen, axial reinforcing ribs, which are preferably formed at the same time as the rolling of the circumferential grooves.

During the process of rolling, the material in the groove is work-hardened, which further contributes to increasing the strength of the groove. When the reinforcing ribs are produced at the same time as rolling; they are located at the inner surface, or bottom, of the groove, and do not extend as far as the outer diameter of the rivet body.

The total width of the axial ribs relative to the circumference of the rivet body may be varied depending on the reinforcing required, but is typically between 8 and 10% of the circumference of the rivet body.

For a rivet having a diameter of 4.8 mm, the grooves are preferably rolled to a depth and axial length of 0.5 mm. For such a rivet, where four ribs are provided, the reinforcing ribs should preferably be about 0.4 mm in width and between 0.1 and 0.15 mm in height.

BRIEF DESCRIPTION OF THE ACCOMPANYING DRAWINGS

Two embodiments of a multigrip blind rivet will now be described with reference to the accompanying drawings, in which, FIG. 1 is a view of a first embodiment of an assembled rivet partially in section;

DETAILED DESCRIPTION OF THE PREFERRED EMBODIMENT

Figure 1:
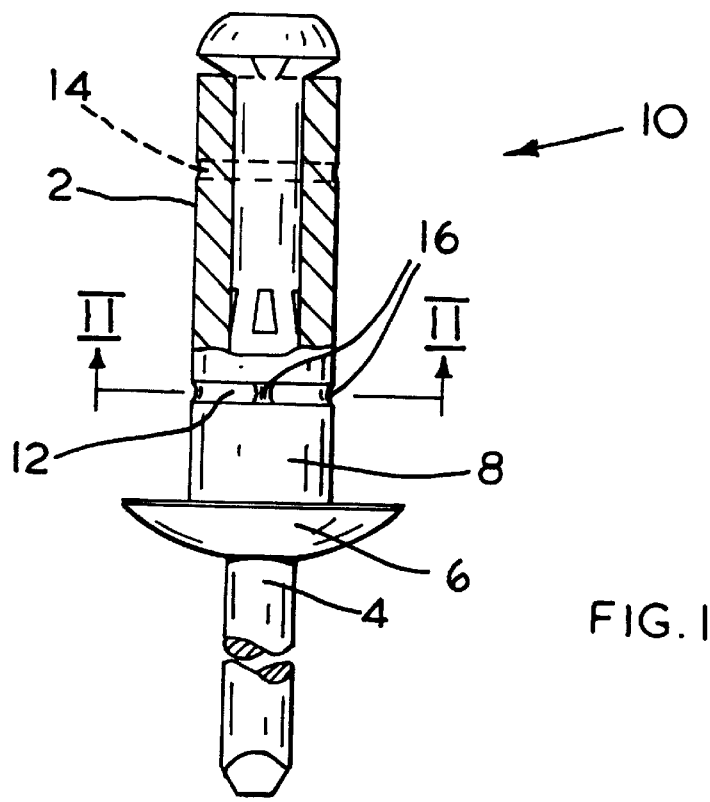
Figure 2:
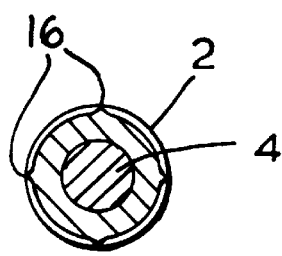
FIG. 2 is a section on the line II—II of FIG. 1.

As can be seen from FIG. 1, a first embodiment of rivet assembly shown generally at 10 comprises a rivet body 2 and a mandrel 4. The rivet body 2 comprises an enlarged head 6 and a shank portion 8. A plurality of circumferential grooves 12, 14 are formed in the shank portion 8 and are spaced from each other along the length of the shank 8. Each of the grooves 12, 14 is reinforced by four axial ribs 16 spaced at regular angular intervals around the circumference of the groove 12, 14.

Figure 3:
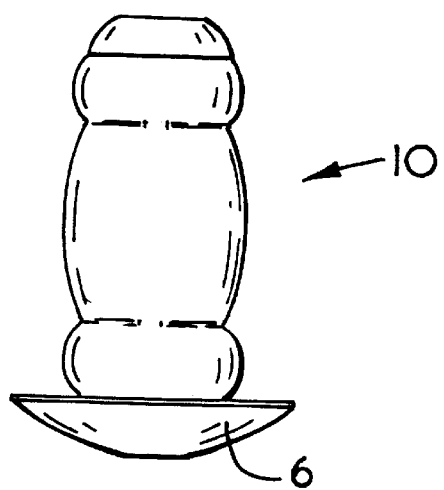
FIG. 3 is a view of the rivet when set.

On setting, as can be seen from FIG. 3, the rivet body 2 reduces in length, first by the grooves 12, 14 collapsing and then by the rivet body 2 expanding as the body material is displaced radially outwards. The strength of the rivet body is increased by the presence of the reinforcing ribs 16.

Figure 4:
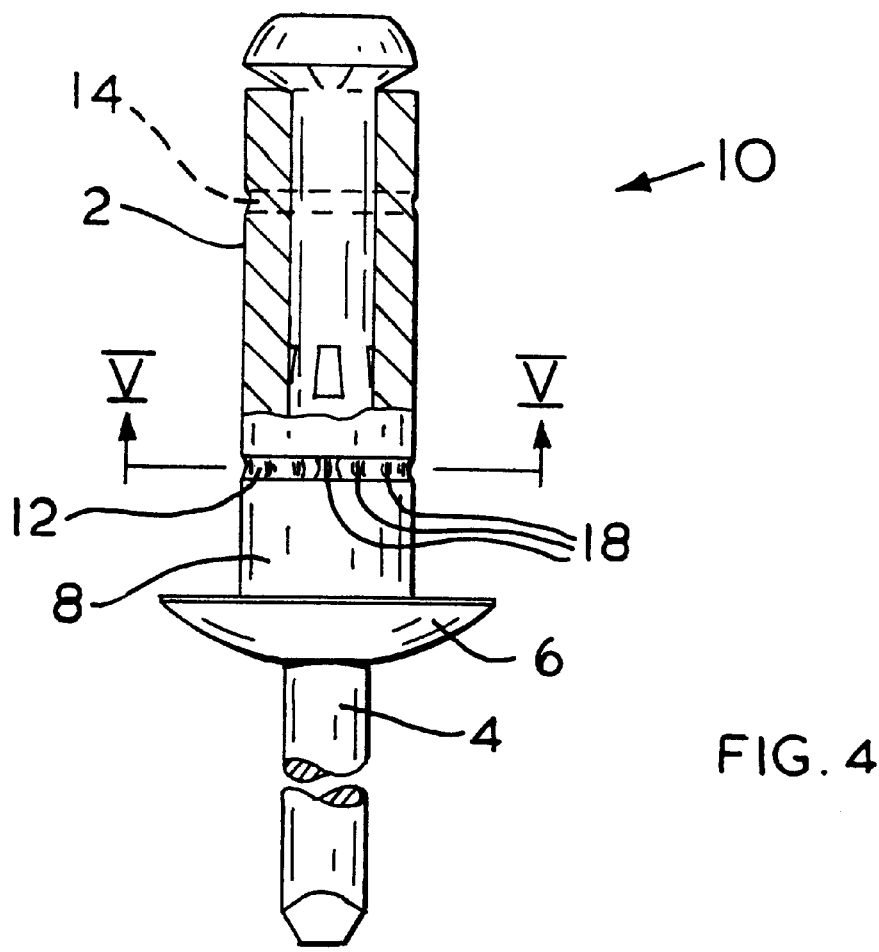
FIG. 4 is a view of a second embodiment of an assembled rivet partially in section.
Figure 5:
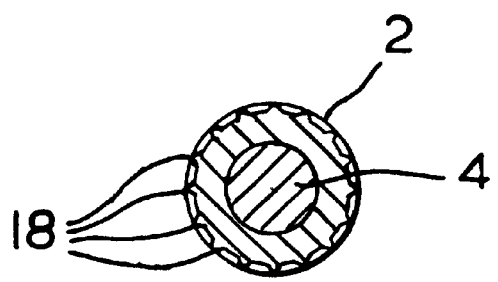
FIG. 5 is a section on the line V—V of FIG. 4.

An alternative embodiment of a rivet assembly is shown in FIGS. 4 and 5. As can be seen from FIG. 4, the rivet assembly of FIG. 4 differs from the rivet assembly of FIG. 1, in that the four axial ribs 16 are replaced by a larger number, in this case sixteen axial ribs 18.

The rivet assembly of FIG. 4 is set in a similar manner to that of FIG. 1.

What is claimed is:
1. A blind rivet for a workpiece having a substantially hollow cylindrical body adapted to receive a mandrel therein, comprising:
  a. a pair of circumferential groove formed on the cylindrical body in two predetermined axially spaced annular locations;

b. a plurality of axial reinforcing ribs formed in each of said circumferential grooves;

c. each of the ribs being shaped to decrease radially outwardly in cross-section from a wider dimension at the base of the circumferential groove to a narrower dimension at the outer surface of the cylindrical body; and d. the cylindrical body being adapted to expand radially between said axially spaced circumferential grooves responsive to the action of the mandrel to connect the cylindrical body to the workpiece.

2. The combination claimed in claim 1 wherein:

a. the total width of the axial reinforcing ribs formed in each of the circumferential grooves is equal to from eight percent (8%) to ten percent (10%) of the circumferential measurement of the circumferential groove.

3. The combination claimed in claim 2 wherein:

a. the number of axial reinforcing ribs formed in each of the circumferential grooves creating an equal number of recesses in the circumferential grooves.

* * * * *